April 29, 1969
W. A. RHODES
3,441,405
ELECTROCHEMICAL CHELATION AND PRECIPITATION PROCESS
FOR EXTRACTION OF BERYLLIUM FROM ORES
Filed Jan. 24, 1966
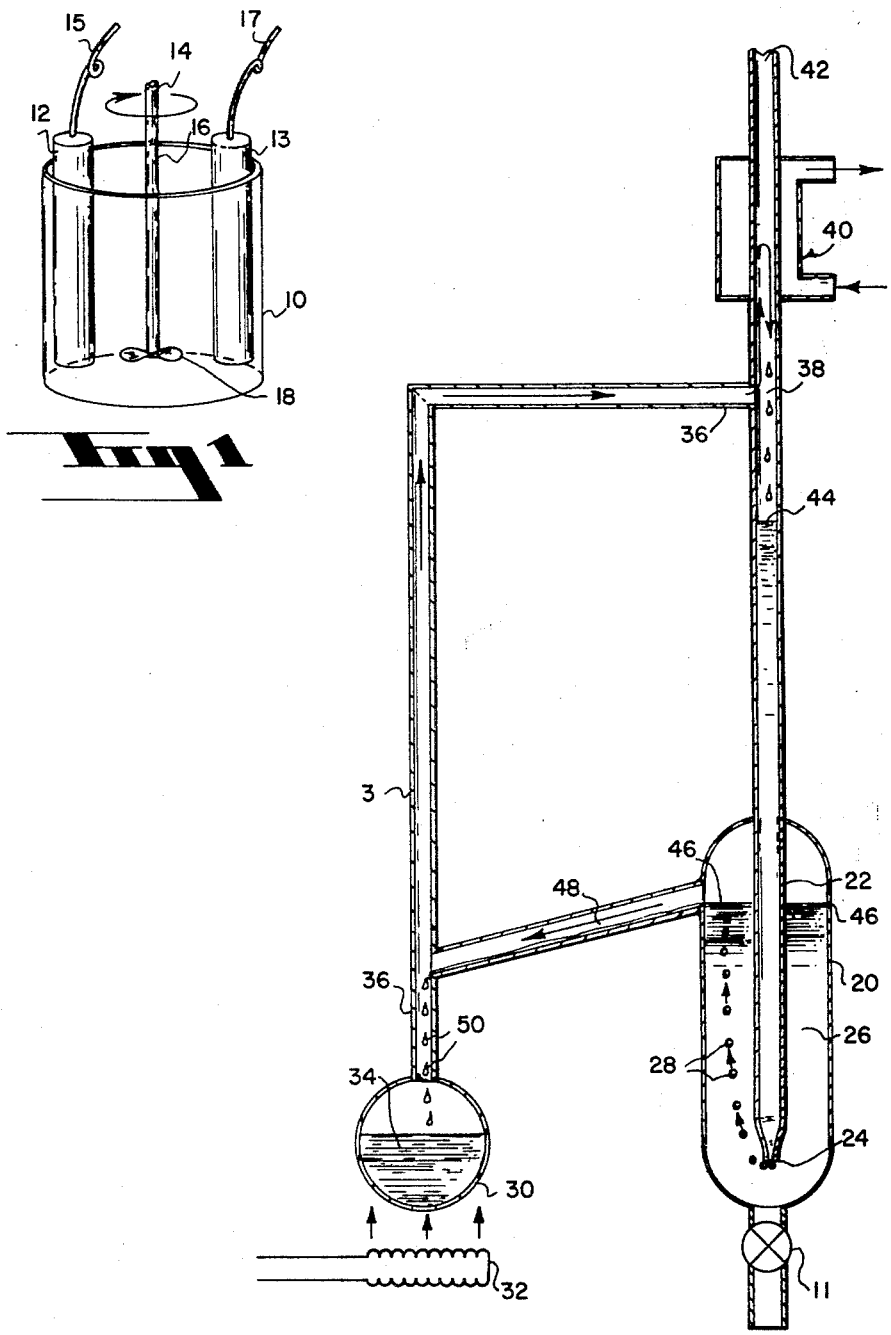
INVENTOR.
WILLIAM A. RHODES
BY

United States Patent Office 3,441,405
Patented Apr. 29, 1969

3,441,405
ELECTROCHEMICAL CHELATION AND PRECIPITATION PROCESS FOR EXTRACTION OF BERYLLIUM FROM ORES
William A. Rhodes, 4421 N. 13th Place,
Phoenix, Ariz. 85014
Filed Jan. 24, 1966, Ser. No. 522,660
Int. Cl. C22b 3/00
U.S. Cl. 75—101                                                                4 Claims

ABSTRACT OF THE DISCLOSURE

A method for extraction of beryllium from ores consisting in placing crushed ore in a solution of oxalic acid to form a mixture having a pH ranging between 4 and 5, and subjecting said mixture to alternating current by means of carbon electrodes; the alternating current being at a wattage of approximately 7 per square inch to provide a beryllium pregnant liquor, then introducing an excess of hydrochloric acid to the pregnant liquor for reaction with the amount of beryllium in liquor, then percolating benzene through the pregnant liquor to concentrate beryllium chloride, then boiling the benzene away to leave a concentrated precipitate of beryllium chloride.

---

This invention relates to an electrochemical chelation and precipitation process for extraction of beryllium from ores.

In the art of extracting beryllium from various ores, most of the conventional or prior art processes employ several chemical reactions, some of them requiring at least six of such reactions, while the more complex prior art methods may include many more reactions before the beryllium metal is obtained.

Accordingly, it is an object of the present invention to provide a novel method for the extraction of beryllium from ores which involves only three basic reactions, the first being electrochemical chelation of beryllium from the ore; the second being the isolation and concentration of the metal compound of beryllium, while the third involves the purification of the beryllium from the compound.

Another object of the invention is to provide a novel electrochemical chelation step in the extraction of beryllium from ores which comprises the use of a pair of electrodes charged with alternating current and agitation of beryllium ore particles in a chelating agent and into contact with the electrodes to provide a very rapid and efficient production of a beryllium pregnant liquor.

Another object of the invention is to provide a novel electrochemical chelation process for extraction of beryllium from ore, wherein particles of beryllium in a chelating solution having an upper limit of pH ranging lower than 5.0, may be agitated into continuous contact with a pair of electrodes charged with alternating current to achieve very rapid and efficient production of a beryllium pregnant liquor.

Another object of the invention is to provide a process for extracting beryllium from ores, wherein the foregoing chelation process may be followed by the subjection of the pregnant liquor to hydrochloric acid to produce beryllium chloride which is subsequently coupled with a benzene solvent efficiently and quickly to permit concentration of beryllium chloride when the benzene is evaporated therefrom.

Further objects and advantages of the invention may be apparent from the following specification, claims and accompanying drawings, in which:

FIG. 1 is a diagrammatic illustration of an apparatus used for an electrochemical chelation step used for extraction of beryllium from ores in accordance with the present invention; and FIG. 2 is a diagrammatic view of apparatus used for treating a beryllium pregnant liquor to collect and precipitate beryllium therefrom in accordance with the present invention.

In accordance with the present invention, beryllium bearing ore is crushed into fine particles, as for example, 200 mesh or smaller and indeed the efficiency of the extraction process, according to the invention, may increase substantially as the ore is crushed to a finer mesh.

With reference to FIG. 1 of the drawings, a container 10 contains two electrodes 12 and 13 which are disposed in the container to be contacted by material therein, as will be hereinafter described. These electrodes may be of carbon or other material, such that they will not be adversely effected by abrasive action or by chemical action, in accordance with the invention, as will be hereinafter described in detail.

A stirring device 14 comprising a motor driven shaft 16 having an impeller 18 on its lower end may be used to agitate the particles in a fluid mixture in the container 10, as will be hereinafter described.

Conductors 15 and 17 are coupled to the electrodes 12 and 13, respectively, and are adapted to conduct alternating current to the electrodes 12 and 13 in accordance with the present invention. The electrodes 12 and 13 disposed in the container 10 are disposed intimately to be contacted by particles of ore and an electrolyte, as will be hereinafter described in accordance with the invention.

The stirring device 14 rotates at such velocity, that little or no particles of ore may be allowed to remain on the bottom. The finer the ore is ground or crushed, the less energy is needed to be imparted by the stirring device 14 to keep the ore particles in suspension and to cause them intimately to contact the electrodes 12 and 13.

The crushed beryllium ore having an approximate known percentage of beryllium expressed as a percent metal is placed in the tank. Specifically, an organic acid, such as oxalic acid or catechol generally referred to herein as a chelating agent is placed in solution in the container 10. Oxalic acid or catechol may also be defined or expressed as an organic acid. The amount of this acid may be slightly more than is necessary to completely react with the known metallic constituents of the beryllium ore which is placed in the container 10. Oxalic acid is preferred for use in the process of the present invention due to the fact that, as for example, 38 grams of beryllium oxalate will be soluable in 100 ml. of water at 25° C. in the container 10. Thus, it is possible to obtain very rich concentrates of beryllium. There are few known organic substances which will compound with beryllium to such a high degree as oxalic acid.

With the foregoing ore particles and solution in the container 10, the stirrer 14 is started and the water is added to make a thin liquid mud. At this time, alternating current, for example, 60 cycles per second, is fed to the electrodes through the conductors 15 and 17 and optimum wattage per square inch of area of the electrodes may be approximately 7. More wattage may be introduced by raising the voltage. However, at a given wattage per square inch of electrodes, too much power could be wasted in the form of heat energy.

According to the present invention, the use of alternating current rather than direct current, is important since it is not desired to cause electrolysis to take place in the chelating solution.

Should direct current be used in the chemicals of the electrolyte, hereinbefore described, decomposition of said electrolyte would take place in addition to electrode damage. Such would increase the cost of the metal chelation process of the invention. The alternating current applied to the electrodes is preferred for the following reasons: First of all, electrolysis per se cannot take place as any minute bubbles or chemical changes forming at either electrode 12 or 13 during one-half A.C. cycle caused by decomposition of water and/or chemicals is instantly reversed and absorbed when the cycle is reversed.

Thus, the electrolyte chemicals and water remains substantially intact. Additionally, particles of ore nearby or in contact with the electrodes receive electrical and chemical bombardment that is not possible without such application of alternating current electrical energy applied during the movement of the particles into contact with the electrodes 12 and 13.

It is theorized that the momentary energy level is raised in the vicinity of the particles during close proximity or contact with the electrodes 12 and 13, thus, causing a reaction to occur therein due to this increased energy level in the presence of the chelating agent in the solution contained in the container 10.

After a period of time, during the stirring and electrical bombardment of the particles, depending somewhat on the fineness thereof, the batch of material is filtered or merely allowed to settle out. Filtering is preferred, since the bombardment hereinbefore referred to reduces a portion of this ore material to a colloidal suspension.

The ore waste is then dumped and the pregnant liquor is passed on to the beryllium extractor apparatus, as disclosed in FIG. 2.

With reference to FIG. 2, it will be seen that apparatus of FIG. 2 includes a container 20 disposed to contain the pregnant liquor removed from the container 10 shown in FIG. 1. This pregnant liquor 26 is placed in the container portion 20 of the apparatus, shown in FIG. 2, and hydrochloric acid is added thereto, such as to react with the beryllium in the pregnant liquor to produce beryllium chloride.

In the apparatus shown in FIG. 2 of the drawings, liquid solvent injector tube 22 is provided with a downwardly directed open lower end 24 which serves to emit a solvent liquid which has a specific gravity less than the pregnant liquor, as will be hereinafter described. The solvent liquid emitted from the opening 24 percolates upward through the liquor 26 in the form of liquid spheres 28, as indicated in FIG. 2 of the drawings. Thus, acting to mix the solvent liquid droplet surfaces with the pregnant liquor, the apparatus shown in FIG. 2 does not require any agitation or stirring device in the container portion 20, but relies upon the percolating effect of the droplets 28 to cause mixing of the solvent with the pregnant liquor which has been reacted with hydrochloric acid to attain a beryllium chloride in solution.

A boiler 30 having a heat source 32 is filled or partially filled with a solvent 34 which may be a hydrocarbon, such as benzene or xylene, these hydrocarbons having a particular affinity for beryllium chloride.

Benzene is preferred in accordance with the invention, and communicating with the boiler 30 at the upper end thereof is an upstanding conduit 36 disposed to conduct vapors upwardly to a branch area 38 communicating with the conduit 22 and directly above the area 38 is a condenser 40 which prevents escape of benzene vapor through an atmospheric vent 42. Thus, the condenser 40 condenses the benzene vapor to provide a liquid solvent head standing in the conduit 22 approximately at level 44. This solvent head is substantially above a level 45 of the pregnant liquor 26 in the container portion 20 and, accordingly, the benzene solvent passes upwardly in the form of the globules 28 through the pregnant liquor 26 forming a couple with the beryllium chloride, such that the beryllium chloride is carried to the upper level 46 and will spill through an inclined conduit 48 back into the conduit 36 and return a solution of beryllium chloride and benzene downwardly into the boiler 30. Thus, a concentrate of the beryllium chloride is built up in the boiler 30, as will be hereinafter described in detail.

If benzene is used, the boiler may be operated at approximately 180° F. by a flame or other heating elements, such as an electrical resistance type.

It will be noted that the evaporation rate of the benzene is such that the head level 44 is attained due to the fact that the outlet opening 24, hereinbefore described, is restricted to provide for the building of the benzene head to the level 44 so that sufficient stirring agitation may be attained by the flow of the benzene from the opening 24 into the pregnant liquor 26 whereupon the specific gravity of the benzene being less than that of the pregnant liquor causes the benzene to percolate or rise to the top and concentrate at the level 46 at which it spills over into the conduit 48. The globules 28 which may also be termed minute droplets which have a substantial surface area which couples with beryllium chloride in the pregnant liquor so that the greater surface area of the droplets 28 may be attained, as desired, to provide for a very rapid coupling with beryllium chloride and removal of the beryllium from the pregnant liquor and concentration thereof in the benzene in the boiler 30, the rise of said globules 28 causing constant stirring of the pregnant liquor 26.

When the desired amount of the beryllium chloride has been removed from the pregnant liquor 26 and transferred to the boiler 30, the benzene may be entirely boiled away from the boiler 30 by first draining the pregnant liquor 26 through the drain valve 11 and subsequently permitting the benzene to be boiled from the boiler 30 and collected in the container 20. With the complete evaporation of the benzene from the boiler 30, the concentrate of beryllium chloride may then be removed from the boiler and further processed by conventional methods to attain metallic beryllium from the beryllium chloride. At this point, a new charge of pregnant liquor may be forced upward through the valve 11, thereby pushing the solvent upward to run back into the boiler 30 via conduit 48.

It will be understood that the residual solvent in the boiler 30 may be evaporated into other containers rather than the container 20, if desired, to obtain the beryllium chloride concentrate and, further, it will be understood that in the event hydrochloric acid is not placed in the pregnant liquor 26, that some metal oxalates will be transferred by benzene. However, this is not nearly as efficient as converting the beryllium to a chloride, as hereinbefore described.

After the beryllium chloride or beryllium concentrate is removed from the boiler 30 several processes may be performed to obtain the final form of the beryllium. For example, if no hydrochloric acid is used in the pregnant liquor 26, a beryllium oxalate may be obtained which, when heated to a certain degree, becomes beryllium carbonate and by further raising the temperature, a beryllium oxide may be obtained.

For the more efficient beryllium chloride concentrate, as disclosed herein, calcium may be mixed with the same, then transferred to a vacuum oven. The temperature may then be increased appropriately until calcium draws away and combines with the chlorine forming calcium chloride and leaving metallic beryllium.

At this point, the calcium chloride being soluable in water, may be washed away leaving behind pure metallic beryllium.

It will be obvious to those skilled in the art that various modifications of the present invention may be resorted to in a manner limited only by a just interpretation of the following claims.

I claim:

1. A method for extraction of beryllium from ores consisting in: crushing beryllium containing ore; then placing the crushed ore in an oxalic acid bath to form a mixture having a pH ranging between 4.0 and 5.0, the mixture being disposed in a container wherein a pair of carbon electrodes are intimately engageable by particles of said ore; and applying alternating current to said electrodes while stirring said ore in said bath and thereby causing contact of the ore particles with said electrodes and concurrently electrically charging said particles until a beryllium pregnant liquor is attained in said container, then mixing said liquor with a hydrocarbon solvent having affinity for beryllium and permitting said solvent to collect said beryllium; and then finally evaporating said solvent to leave a precipitate of beryllium.

2. A method for extraction of beryllium from ores consisting in: crushing beryllium containing ore into fine particles; then placing the particles in a solution of an oxalic acid to form a mixture having a pH ranging between 4.0 and 5.0, the mixture being disposed in a container wherein a pair of carbon electrodes are intimately engageable by particles of said ore; and applying alternating current to said electrodes while stirring said ore and said oxalic acid and causing intimate contact of said particles with said electrodes until a beryllium pregnant liquor is attained in said container; then mixing an excess of hydrochloric acid with said pregnant liquor for reaction with the beryllium in said liquor to produce beryllium chloride and to cause collection of the beryllium chloride in the benzene; and then evaporating said benzene to leave a precipitate of beryllium chloride.

3. A method for extraction of beryllium from ores consisting in: crushing beryllium containing ore into fine particles; then placing the crushed ore in a solution of oxalic acid to form a mixture having a pH ranging between 4.0 and 5.0, the mixture being disposed in a container wherein a pair of carbon electrodes are intimately engageable by particles of said ore; then applying alternating current to said electrodes while stirring said ore particles in said oxalic acid to cause intimate contact of the ore particles with the electrodes until a beryllium pregnant liquor is attained in said container; then placing an excess of hydrochloric acid in said pregnant liquor for reaction with said beryllium in said liquor and progressively percolating benzene upward through said pregnant liquor to couple with beryllium chloride formed as a reaction between the beryllium pregnant liquor and the hydrochloric acid; then passing the percolated beryllium chloride bearing benzene into a boiler and boiling away the benzene to concentrate beryllium chloride in said boiler and concurrently recycling the boiled away benzene and percolating it upwardly through said pregnant liquor until a desired amount of the beryllium chloride is removed from said pregnant liquor and concentrated in said boiler; and then finally boiling away the benzene to leave a final precipitate of beryllium chloride in said boiler.

4. The invention, as defined in claim 3, wherein said precipitate of beryllium chloride is finally reduced to a metallic beryllium state.

References Cited

UNITED STATES PATENTS

| | | | |
|---|---|---|---|
| 1,082,596 | 12/1913 | Kitsee | 204—130 |
| 3,148,022 | 9/1964 | Kruse | 23—22 |
| 3,288,559 | 11/1966 | Biermann | 23—23 |
| 3,359,064 | 12/1967 | Crouse et al. | 23—23 |

OTHER REFERENCES

Moore: Purification of Beryllium Compounds: A Literature Survey, June 16, 1960, ORNL–2938, p. 21.

L. DEWAYNE RUTLEDGE, *Primary Examiner.*

TERRY R. FRYE, *Assistant Examiner.*

U.S. Cl. X.R.

23—19, 22; 75—121; 204—193